(12) United States Patent
Campesi et al.

(10) Patent No.: US 7,897,276 B2
(45) Date of Patent: Mar. 1, 2011

(54) INTERSECTING BATTERY CAVITIES

(75) Inventors: Robert Campesi, San Jose, CA (US);
Yancy Chen, Campbell, CA (US);
David N. Skinner, Redwood Shores, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 882 days.

(21) Appl. No.: 11/830,756

(22) Filed: Jul. 30, 2007

(65) Prior Publication Data

US 2009/0035608 A1  Feb. 5, 2009

(51) Int. Cl.
*H01M 2/10* (2006.01)
(52) U.S. Cl. .............................. 429/99; 429/96; 429/98; 429/100
(58) Field of Classification Search .................. 429/96, 429/98, 99, 100
See application file for complete search history.

(56) References Cited

U.S. PATENT DOCUMENTS

| 5,246,790 | A | * | 9/1993 | Mooney et al. | 429/7 |
| 5,516,306 | A | * | 5/1996 | Scrivano | 439/500 |
| 6,850,229 | B2 | * | 2/2005 | Casebolt et al. | 345/173 |

FOREIGN PATENT DOCUMENTS

| KR | 10-2002-0000111 | 4/2002 |
| KR | 10-2006-0022972 | 8/2004 |

* cited by examiner

*Primary Examiner*—Patrick Ryan
*Assistant Examiner*—Julian Mercado

(57) ABSTRACT

A system comprising a first battery cavity and a second battery cavity adjacent to the first battery cavity. Both of the first and second battery cavities are oriented in a common direction. The system also comprises a third battery cavity which comprises at least part of the first battery cavity and at least part of the second battery cavity. The third battery cavity is oriented in a different direction than the common direction.

22 Claims, 4 Drawing Sheets

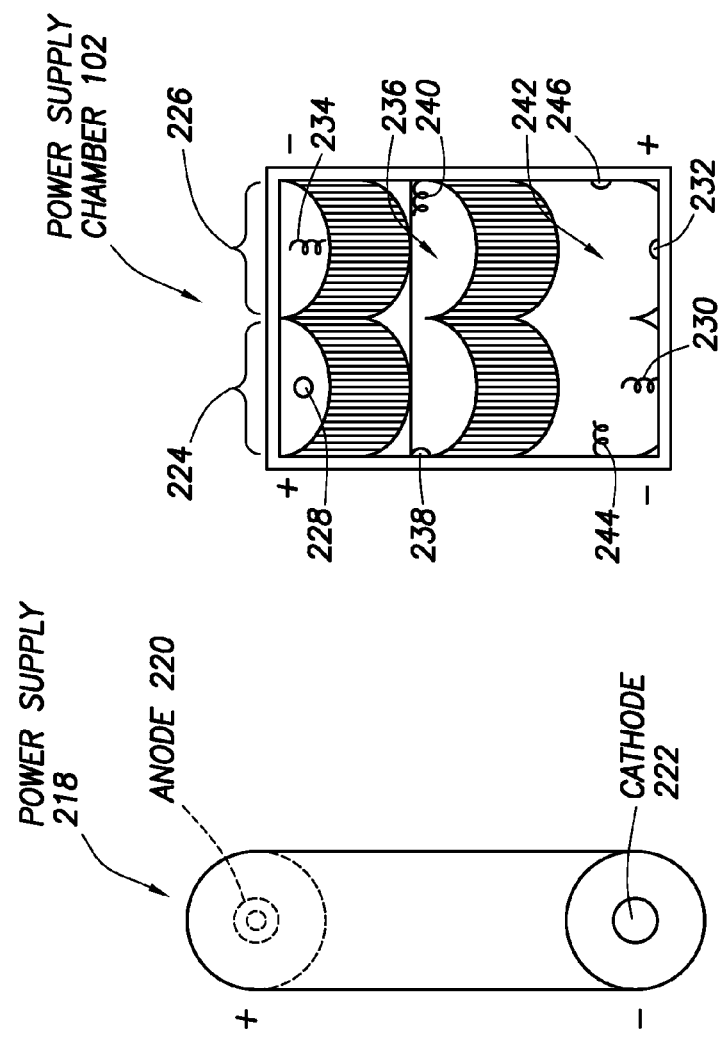
FIG.2C
FIG.2B
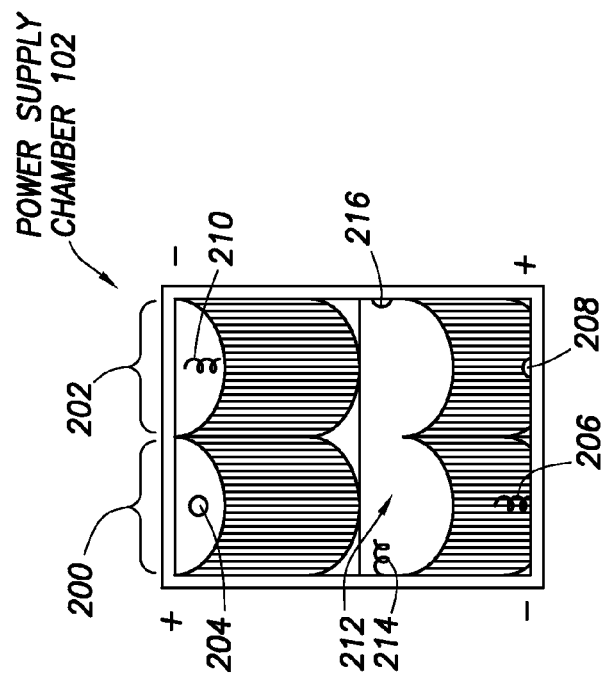
FIG.2A

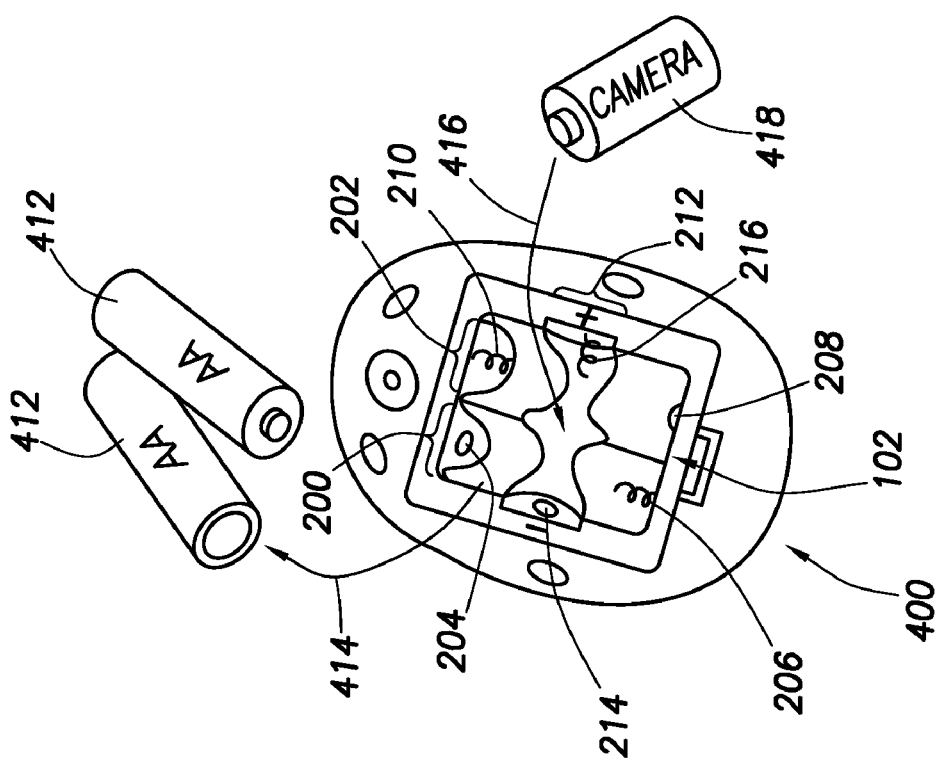
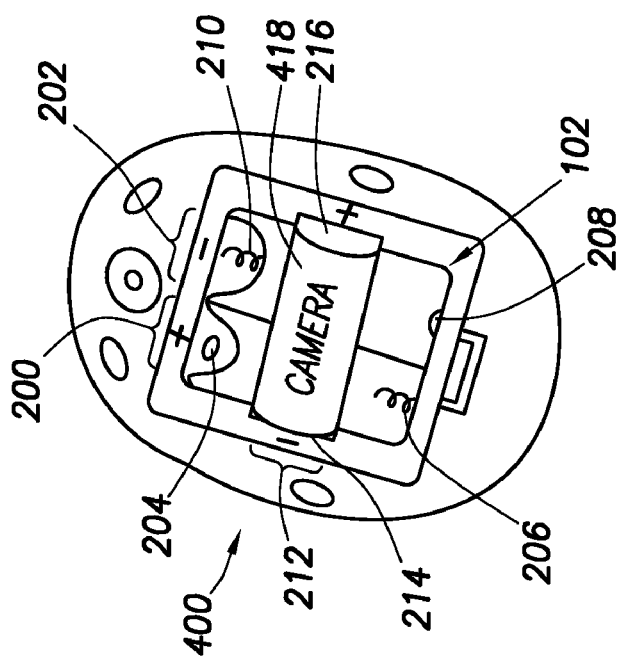
FIG. 4D
FIG. 4E

INTERSECTING BATTERY CAVITIES

BACKGROUND

Different types of batteries may have different sizes, different anode and cathode configurations, and/or different chemistries. Many electronic devices are capable of receiving power from multiple types of batteries. However, because multiple battery chambers may be needed to accommodate different types of batteries (e.g., due to different anode and cathode configurations of the batteries), devices that are able to receive power from multiple types of batteries are undesirably larger than devices that are only able to receive power from a single type of battery. Not only does increased electronic device size result in increased manufacturing costs, but larger electronic devices can be inconvenient and awkward to use.

BRIEF DESCRIPTION OF THE DRAWINGS

For a detailed description of exemplary embodiments of the invention, reference will now be made to the accompanying drawings in which:

FIG. 2a shows an illustrative battery chamber that may be housed within the electronic device of FIG. 1, in accordance with embodiments;

FIG. 2b shows an illustrative battery that may be inserted into the chamber of FIG. 2a, in accordance with embodiments;

FIG. 2c shows another illustrative battery chamber that may be housed within the electronic device of FIG. 1, in accordance with embodiments;

FIGS. 4a-4e show an illustrative sequence of steps by which the device of FIG. 1 may be used in accordance with embodiments.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. By "intersect(s)," it is meant that one component comprises another component such that the two components share a common space. Thus, for example, if a first battery cavity intersects a second battery cavity, the first battery cavity may comprise at least part of the second battery cavity or the second battery cavity may comprise at least part of the first battery cavity, such that the first and second battery cavities share common space.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein is a battery chamber adapted to house multiple types of batteries. The battery chamber comprises a plurality of battery cavities in which batteries may be housed. The battery cavities are oriented such that the amount of space required to house multiple types of batteries is approximately the same as the amount of space required to house only a single type of battery. For this reason, implementation of the disclosed battery chamber in an electronic device is not associated with an increase in the size of the electronic device.

Figure 1:
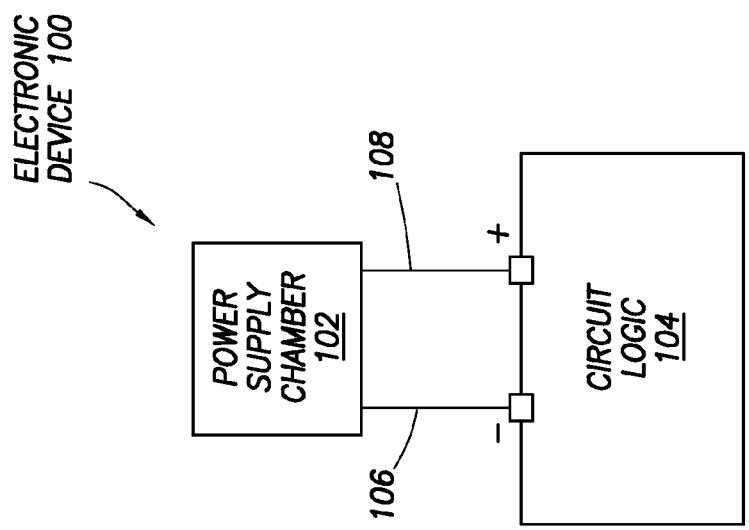
FIG. 1 shows an illustrative electronic device implementing the technique disclosed herein, in accordance with embodiments.

FIG. 1 shows an illustrative electronic device 100 implementing the disclosed battery chamber in accordance with various embodiments. The electronic device may comprise any suitable device, such as a wireless mouse, a toy, a camera, or any other type of electronic device that may benefit from the use of multiple battery types (e.g., devices using rechargeable batteries). The electronic device 100 comprises a battery chamber 102 coupled to a circuit logic 104 via connections 106 and 108. The battery chamber 102, described in detail below, is adapted to house multiple types of batteries in accordance with various embodiments. Power from one or more of the batteries housed in the battery chamber 102 is provided to the circuit logic 104 via a positive terminal connection 108 and a negative terminal connection 106.

FIG. 2a shows an illustrative battery chamber 102 in detail. The battery chamber 102 comprises a first battery cavity 200, a second battery cavity 202 and a third battery cavity 212. The first battery cavity 200 comprises a positive terminal 204 and a negative terminal 206, although in some embodiments, the polarities of the terminals 204 and 206 may be reversed. The battery cavity 200 is adapted to house any suitable type of battery (e.g., alkaline batteries, lithium ion batteries, nickel cadmium batteries, nickel metal hydride batteries). Battery "types" may be determined according to battery size, battery shape, battery anode and cathode configuration, battery chemistry, etc. The terminals 204 and 206 draw power from a battery housed in the first battery cavity 200 and provide this power to a load (shown in FIGS. 1 and 3), such as the circuit logic 104.

The second battery cavity 202 is similar to the first battery cavity 200 in at least some respects. The battery cavity 202 comprises a positive terminal 208 and a negative terminal 210, although in some embodiments, the polarities of the terminals 208 and 210 may be reversed. The battery cavity 210 is adapted to house any suitable type of battery (e.g., alkaline batteries, lithium ion batteries, nickel cadmium batteries, nickel metal hydride batteries). The terminals 208 and 210 draw power from a battery housed in the second battery cavity 210 and provide this power to a load, such as the circuit logic 104 shown in FIGS. 1 and 3. In at least some embodiments, the battery cavities 200 and 202 are adapted to house and to draw power from a common type of battery. Although the battery cavities 200 and 202 are shaped to house batteries having substantially cylindrical shapes, the scope of this disclosure is not limited to cavities having any particular shape.

As explained above, the battery chamber 102 comprises a third battery cavity 212. In accordance with various embodiments, the third battery cavity 212 intersects the first and second battery cavities 200, 202. By "intersects," it is meant that the first and second battery cavities 200, 202 share space with (i.e., comprise) at least some or all of the third battery cavity 212. In some embodiments, the third battery cavity 212 intersects the first and second battery cavities 200, 202 such that the cavities 200 and 202 contain a majority of the third battery cavity 212. For this reason, if the third battery cavity 212 houses a battery that is coupled to the terminals 214 and 216, the first and second battery cavities 200, 202 may be unable to house batteries that are coupled to the terminals 204, 206, 208 or 210. Similarly, if either one of the first and/or second battery cavities 200, 202 houses a battery that is coupled to a corresponding terminal, the third battery cavity 212 may be unable to house a battery that is coupled to the terminals 214 and 216. Stated otherwise, in at least some embodiments, it is not possible to simultaneously house batteries in all battery cavities, where the batteries are coupled to corresponding terminals.

Further, in some embodiments, the third battery cavity 212 is oriented in a direction that is substantially perpendicular to the direction in which the first and second battery cavities 200 and 202 are oriented. In at least some embodiments, the direction in which the third battery cavity 212 is oriented is at least 45 degrees apart from the direction in which the first and second battery cavities 200, 202 are oriented. In at least some embodiments, the direction in which the third battery cavity 212 is oriented is between 75 degrees and 105 degrees (inclusive) apart from the direction in which the first and second battery cavities 200, 202 are oriented. In at least some embodiments, the direction in which the third battery cavity 212 is oriented is between 45 and 135 degrees (inclusive) apart from the direction in which the first and second battery cavities 200, 202 are oriented. The scope of this disclosure is not limited to any specific orientation of the multiple battery cavities, as long as the battery chamber 102 is adapted to house different types of batteries (at different times) in a space that is not substantially larger than that required to house a single type of battery. Real estate savings may be approximately 50%.

For example, as shown in FIG. 2b, there is shown an illustrative battery 218. In some embodiments, the battery 218 may comprise an alkaline battery, such as a AA-type or AAA-type battery. The battery 218 may have a positive terminal, referred to as an anode 220, and a negative terminal, referred to as a cathode 222. The battery 218 may be housed in the first battery cavity 200 such that the anode 220 couples to the positive terminal 204 and the cathode 222 couples to the negative terminal 206. The second battery cavity 202 may house a similar battery. When both battery cavities 200 and 202 house batteries in this manner, in at least some embodiments, it is not possible to house a battery in the battery cavity 212, because there is insufficient space available to house the battery in the cavity 212. This space is occupied by the batteries housed in the cavities 200 and 202.

However, if it is desired to power the electronic device 100 using a different type of battery than the battery 218, the batteries housed in the battery cavities 200 and 202 may be removed and a different type of battery may be housed in the third battery cavity 212. The battery housed in the third battery cavity 212 may comprise a different type of battery than the supply 218, although it is contemplated that the battery in the third battery cavity 212 is of the same type as the supply 218.

If a battery is housed in the third battery cavity 212, in at least some embodiments, the first and second battery cavities 200 and 202 may be unable to house batteries. The first and second battery cavities 200 and 202 may be unable to house batteries because the cavities 200 and 202 intersect with the third cavity 212, which already houses a battery. For this reason, there may not be sufficient space to house batteries in the cavities 200 and 202 when the third cavity 212 already contains a battery.

Although the battery chamber 102 of FIG. 2a is shown as comprising three battery cavities, the scope of this disclosure is not limited to any specific number of cavities. Instead, any suitable number of cavities may be present within the battery chamber 102. For example, as shown in FIG. 2c, the battery chamber 102 may comprise a first battery cavity 224, a second battery cavity 226, a third battery cavity 236 and a fourth battery cavity 242. The first battery cavity 224 may comprise a positive terminal 228 and a negative terminal 230. The second battery cavity 226 may comprise a positive terminal 232 and a negative terminal 234. The third battery cavity 236 may comprise a positive terminal 238 and a negative terminal 240. The fourth battery cavity 242 may comprise a positive terminal 246 and a negative terminal 244. In embodiments comprising the battery chamber 102 shown in FIG. 2a, batteries may be simultaneously housed in the cavities 236 and 242. Alternatively, batteries may be simultaneously housed in the cavities 224 and 226. However, in at least some embodiments, if a battery is present in either of the first or second cavities 224 or 226, neither the third cavity 236 nor the fourth cavity 242 may be able to house a battery. Similarly, if a battery is present in either of the third or fourth cavities 236 or 242, neither the first cavity 224 nor the second cavity 226 may be able to house a battery.

As explained, the scope of this disclosure is not limited to a battery chamber having any specific number of battery cavities oriented in any specific direction(s). Numerous variations of the cavity arrangements shown in FIGS. 2a and 2c are possible, and the scope of this disclosure encompasses all such variations. For example, a battery chamber 102 may comprise three or more cavities intersecting two or more other cavities that are perpendicular to the three or more cavities. Power is provided from the cavities of the battery chamber 102 to a load, such as the circuit logic 104, as is now described.

Figure 3:
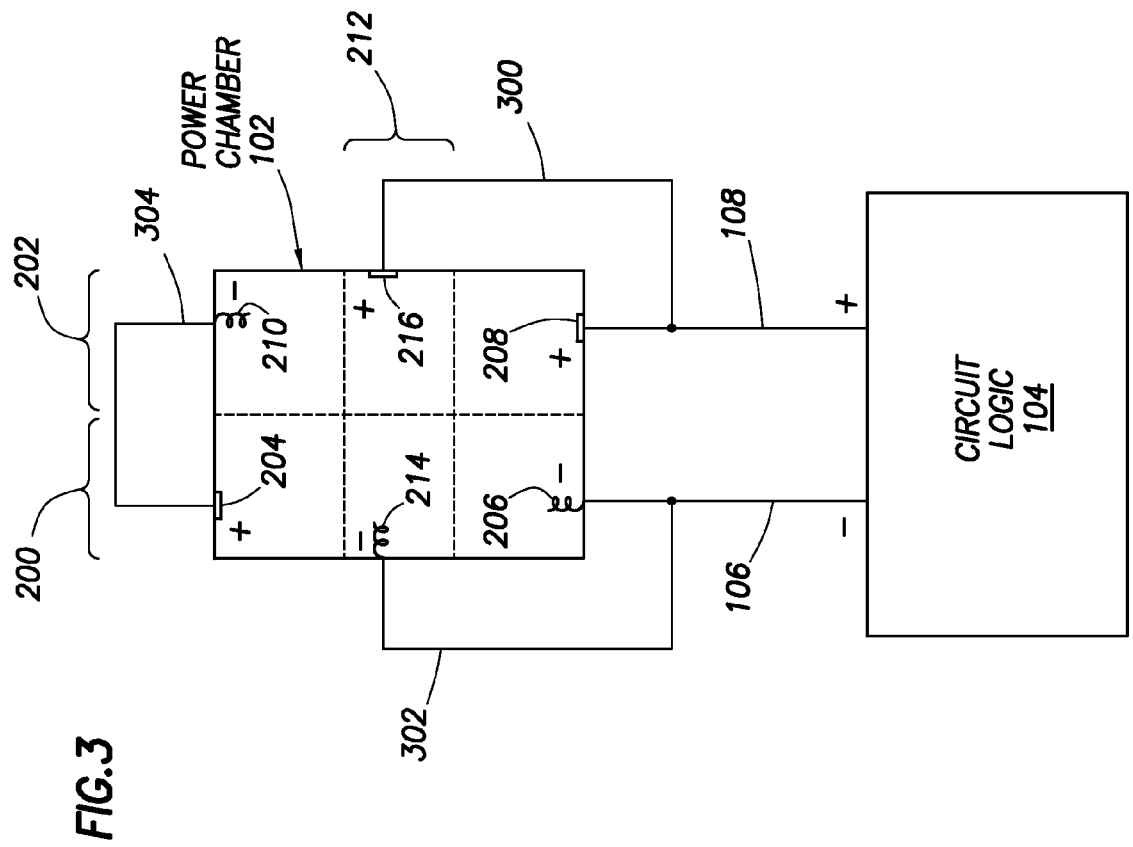
FIG. 3 shows electrical connections between various components of the electronic device of FIG. 1, in accordance with embodiments.

FIG. 3 shows a circuit schematic of the battery chamber 102 arrangement shown in FIG. 2a. As previously explained, the battery chamber 102 provides power to the circuit logic 104 via connections 106 and 108. In at least some embodiments, the connection 106 couples the negative terminal 206 of the first battery cavity 200 to the circuit logic 104. The connection 106 also couples the circuit logic 104 to the negative terminal 214 of the third battery cavity 212 via a connection 302. The connection 108 couples the positive terminal 208 of the second battery cavity 202 to the circuit logic 104. The connection 108 also couples the circuit logic 104 to the positive terminal 216 of the third battery cavity 212 via a connection 300. The positive terminal 204 of the first battery cavity 200 couples to the negative terminal 210 of the second battery cavity 202 via a connection 304. In this way, connection 304 combines batteries of the first and second cavities 200 and 202 in series.

In operation, if batteries (e.g., AA batteries) are housed in the first and second battery cavities 200 and 202 (and thus no battery is housed in the third battery cavity 212), the circuit logic 104 receives a voltage from the serial combination of the batteries in cavities 200 and 202 via connections 106 and 108. However, if a battery (e.g., a lithium-ion battery) is housed in the third battery cavity 212 (and thus no batteries are housed in the first and second cavities 200, 202), the circuit logic 104 receives a voltage via connections 302, 106, 300 and 108. The circuit schematic shown in FIG. 3 is illustrative of the battery cavity arrangement shown in FIG. 2a. The voltage connections between various terminals and the circuit logic 104 may vary as widely as the battery cavity arrangements vary. The scope of this disclosure is intended to capture all such variations.

Figure 4A:
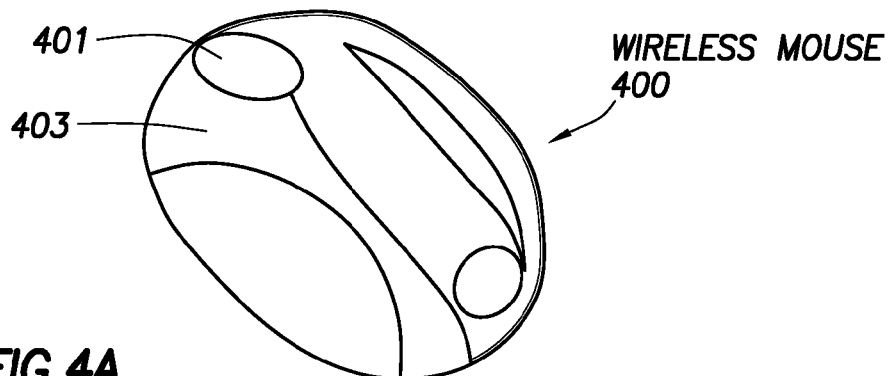
Figure 4B:
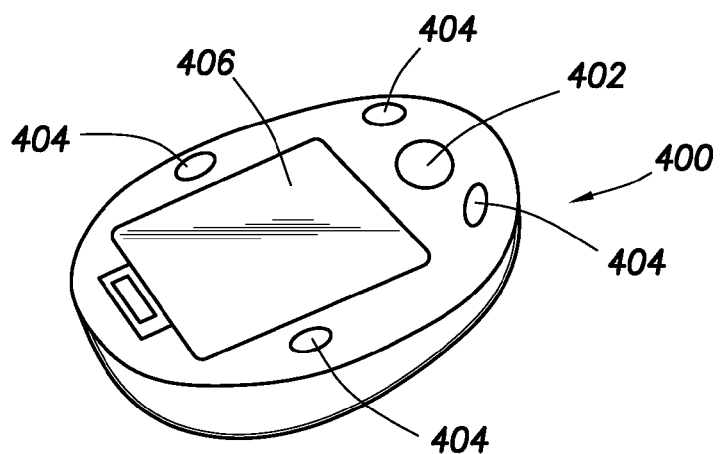

FIGS. 4a-4e shows an illustrative sequence of steps by which the device of FIG. 1 may be used in accordance with various embodiments. Specifically, FIG. 4a shows a wireless mouse 400. The mouse 400 may comprise one or more click-buttons 403 and a scroll wheel 401. The mouse 400 houses a plurality of batteries from which the mouse 400 receives power. In accordance with embodiments, the mouse 400 is adapted to house multiple types of batteries. FIG. 4b shows an underside of the mouse 400. As shown, the underside of the mouse 400 comprises an optical motion sensor 402, pads 404 and a battery chamber cover 406.

Figure 4C:
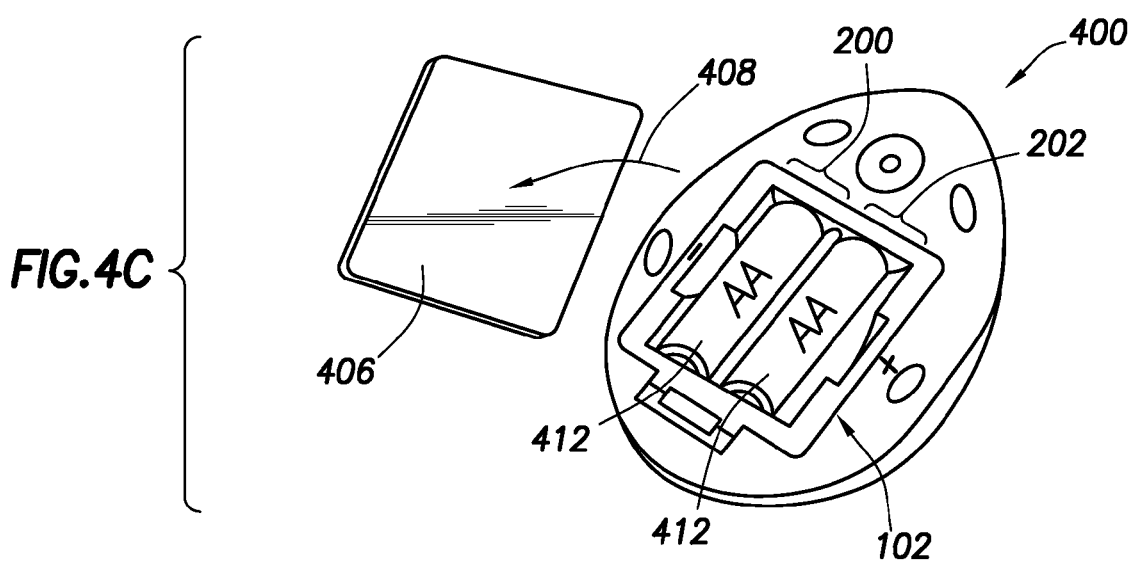

Referring to FIG. 4c, as indicated by numeral 408, the cover 406 may be removed from the mouse 400 to expose the battery chamber 102 comprising two AA-type batteries 412. The batteries 412 are installed in the first and second battery cavities 200 and 202. It may be desired to power the mouse 400 with a different type of battery than the AA-type batteries 412. Accordingly, referring to FIG. 4d and as indicated by numeral 414, the batteries 412 may be removed from the battery chamber 102. As shown in FIG. 4d, the battery chamber 102 comprises the cavities 200, 202 and 212. The battery cavity 200 comprises terminals 200 and 206 to which one of the batteries 412 was coupled. The battery cavity 202 comprises terminals 208 and 210 to which one of the batteries 412 was coupled. The battery cavity 212 comprises terminals 214 and 216 to which a battery may be coupled. Accordingly, as indicated by numeral 416, a battery 418 (e.g., a lithium-ion battery such as a camera battery) is housed to the battery cavity 212. FIG. 4e shows the battery 418 housed in the battery cavity 212. Instead of drawing power from the batteries 412, the mouse 400 draws power from the battery 418. As shown, while battery 418 is housed in the battery cavity 212, the battery cavities 200 and 202 may be unable to house batteries due to space constraints.

The above discussion is meant to be illustrative of the principles and various embodiments of the present invention. Numerous variations and modifications will become apparent to those skilled in the art once the above disclosure is fully appreciated. For example, in some embodiments, the techniques described above may be used with batteries of different voltages. One or more DC-to-DC converts may be implemented to convert the various battery voltages to a desired, target voltage. It is intended that the following claims be interpreted to embrace all such variations and modifications.

What is claimed is:

1. A system, comprising:
   a first battery cavity;
   a second battery cavity adjacent to the first battery cavity, both of said first and second battery cavities oriented in a common direction; and
   a third battery cavity which comprises at least part of the first battery cavity and at least part of the second battery cavity, the third battery cavity oriented in a different direction than said common direction;
   wherein each battery cavity is configured to receive a separate battery, and the third battery cavity is configured to receive a battery based on at least one of the first and second battery cavities being empty.

2. The system of claim 1, wherein the first and second battery cavities are adapted to couple to a common type of battery and the third battery cavity is adapted to couple to another type of battery different from said common type of battery.

3. The system of claim 2, wherein the common type of battery comprises a battery selected from the group consisting of an alkaline battery, a nickel metal hydride battery, a lithium ion battery and a nickel cadmium battery.

4. The system of claim 1, wherein the first and second battery cavities are adapted to couple to batteries which have a common anode and cathode configuration, and wherein the third battery cavity is adapted to couple to batteries which have another anode and cathode configuration different from said common anode and cathode configuration.

5. The system of claim 1, wherein said common direction and said different direction are greater than or equal to 45 degrees apart.

6. The system of claim 1, wherein said common direction and said different direction are between 75 degrees and 105 degrees (inclusive) apart.

7. The system of claim 1, wherein the third battery cavity intersects the first and second battery cavities such that:
   if the third battery cavity houses and draws power from a battery, neither of the first and second battery cavities is able to house and draw power from different batteries; and
   if either of the first and second battery cavities houses and draws power from either of the different batteries, the third battery cavity is unable to house and draw power from said battery.

8. The system of claim 1, wherein the first and second battery cavities comprise a majority of the third battery cavity.

9. The system of claim 1 further comprising circuit logic, wherein the circuit logic is able to receive power from either:
   a) a battery in the third battery cavity, or
   b) batteries in both the first and second battery cavities,
   but not from both a) and b) at the same time.

10. The system of claim 1, wherein the system comprises a device selected from the group consisting of a wireless mouse, a toy, and a device adapted to draw power from multiple types of batteries.

11. The system of claim 1 further comprising a fourth battery cavity, wherein the first and second battery cavities together comprise most of the fourth battery cavity.

12. A system, comprising:
   a first battery cavity;
   a second battery cavity adjacent to the first battery cavity, the first and second battery cavities adapted to receive power from a common type of battery; and
   a third battery cavity adapted to receive power from a different type of battery;
   wherein the first and second battery cavities collectively comprise a majority of the third battery cavity;
   wherein each battery cavity is configured to receive a separate battery, and the third battery cavity is configured to receive a battery based on at least one of the first and second battery cavities being empty.

13. The system of claim 12, wherein the first battery cavity comprises a first positive terminal and a first negative terminal, one of said first terminals adapted to provide power to a circuit logic;
   wherein the second battery cavity comprises a second positive terminal and a second negative terminal, one of said second terminals adapted to provide power to said circuit logic and the other of said second terminals couples to one of the first terminals;

wherein the third battery cavity comprises a third positive terminal and a third negative terminal, both of said third terminals adapted to provide power to said circuit logic; and wherein each of the third positive terminal and the third negative terminal couples either to the one of said first terminals adapted to provide power to the circuit logic or to the one of said second terminals adapted to provide power to said circuit logic.

14. The system of claim 12, wherein batteries cannot be simultaneously housed in the first, second and third battery cavities such that each of the first, second and third battery cavities receives power from said batteries.

15. The system of claim 12, wherein batteries cannot be simultaneously housed in the first and third battery cavities, nor can batteries be simultaneously housed in the second and third battery cavities.

16. The system of claim 12, wherein the system comprises an electronic device selected from the group consisting of a wireless input device, a toy and a device adapted to receive power from a rechargeable battery.

17. The system of claim 12, wherein the first battery cavity is oriented in a first direction and the third battery cavity is oriented in another direction, said another direction is between 45 and 135 degrees (inclusive) from the first direction.

18. A system, comprising:

first means for housing a battery;

second means for housing a battery;

third means for housing a battery, the first and second means collectively comprise at least a portion of said third means;

wherein each means is configured to receive a separate battery, and the third means is configured to receive a battery based on at least one of the first and second means being empty.

19. The system of claim 18, wherein an axis associated with an anode and cathode of the first means is oriented at a different angle compared to another axis associated with another anode and another cathode of the third means.

20. The system of claim 18, wherein each of the first, second and third means comprises two terminals, and wherein the first, second and third means are oriented such that if a single battery is coupled to both terminals of the third means, another single battery cannot be housed to the first means so as to couple to both terminals of the first means, nor can said another single battery be housed to the second means so as to couple to both terminals of the second means.

21. The system of claim 18, wherein the system comprises a wireless mouse.

22. The system of claim 18, wherein the first and second means are oriented in a common direction, and wherein the third means is oriented in a different direction, said different direction between 45 and 135 degrees (inclusive) from the common direction.

* * * * *